(12) United States Patent
Suzuki

(10) Patent No.: US 6,915,375 B2
(45) Date of Patent: *Jul. 5, 2005

US006915375B2

(54) MEMORY APPARATUS AND A DATA-PROCESSING APPARATUS, AND METHOD FOR USING THE MEMORY APPARATUS

(75) Inventor: Kaoru Suzuki, Aichi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/530,290

(22) PCT Filed: Aug. 31, 1999

(86) PCT No.: PCT/JP99/04725

§ 371 (c)(1),
(2), (4) Date: Apr. 27, 2000

(87) PCT Pub. No.: WO00/13089

PCT Pub. Date: Sep. 3, 2000

(65) Prior Publication Data

US 2002/0188796 A1 Dec. 12, 2002

(30) Foreign Application Priority Data

Aug. 31, 1998 (JP) .......................... P10-246407

(51) Int. Cl.[7] .................... G06F 12/00; G06F 9/00; H04L 9/32

(52) U.S. Cl. ........................ 711/103; 711/154; 707/9; 713/202; 713/200; 713/183; 713/184; 713/185

(58) Field of Search ................... 711/103, 154; 707/9; 713/202, 200, 183–185

(56) References Cited

U.S. PATENT DOCUMENTS

| | | | | |
|---|---|---|---|---|
| 5,557,771 A | * | 9/1996 | Kawaguchi | 711/163 |
| 5,606,315 A | * | 2/1997 | Gaskins | 340/825.34 |
| 5,623,637 A | * | 4/1997 | Jones | 395/491 |
| 5,721,877 A | * | 2/1998 | Heflinger et al. | 395/500 |
| 5,845,066 A | * | 12/1998 | Fukuzumi | 713/200 |
| 5,845,313 A | * | 12/1998 | Estakhri | 711/103 |
| 5,857,025 A | * | 1/1999 | Anderson | 380/28 |
| 6,125,435 A | * | 9/2000 | Estakhri et al. | 711/201 |
| 6,131,139 A | * | 10/2000 | Kikuchi | 711/103 |
| 6,272,631 B1 | * | 8/2001 | Thomlinson et al. | 713/155 |

* cited by examiner

*Primary Examiner*—Kimberly McLean-Mayo
(74) *Attorney, Agent, or Firm*—Frommer Lawrence & Haug LLP; William S. Frommer

(57) ABSTRACT

A memory apparatus, such as a memory card, comprising a first storage region and a second storage region. Data can be read from, and written into, the first storage region, in accordance with instructions made by a user. Data can be read from, and written into, the second storage region when a data-processing apparatus, to which the memory apparatus is connected, performs prescribed procedures. Data that should not be easily rewritten or read by users, such as a password or a use history, is stored into the second storage region. The security of the memory apparatus, such as a memory card, can therefore be enhanced.

20 Claims, 8 Drawing Sheets

| PHYSICAL BLOCK | LOGIC BLOCK | FLAG |
|---|---|---|
| 0 | X | S |
| 1 | 5 | U |
| 2 | 3 | U |
| 3 | X | B |
| ⋮ | ⋮ | ⋮ |
| 10 | X | SU |
| 11 | 10 | U |
| ⋮ | ⋮ | ⋮ |

FIG.3

MEMORY APPARATUS AND A DATA-PROCESSING APPARATUS, AND METHOD FOR USING THE MEMORY APPARATUS

TECHNICAL FIELD

The present invention relates to a memory apparatus for storing data, a data-processing apparatus that uses the memory apparatus as a recording medium, and a data-processing method.

BACKGROUND ART

A memory apparatus shaped like a card or a stick (hereinafter referred to as memory card is used as a recording medium in personal computers and digital still cameras. The memory card has a flash memory that is used as memory means.

The memory card has a storage area, which is divided into a plurality of blocks. The data written into the flash memory used as memory means is managed in units of blocks. These blocks may be roughly classified into system blocks and user blocks. A system block stores read-only data. System-related data, such as data representing the block configuration, is written as the read-only data into the system block before the memory card is delivered from the factory. A user block stores user data.

The data items recorded in the memory card may include ones that should not be easily rewritten or read out by the user. Among such data items are the password and the use history. (Hereinafter, data items of this type shall be generally called "special data". In the conventional memory card, special data is stored in the user block, too.

There arise no problems if the special data is stored in the user block, provided that the memory card is used in an electronic apparatus so designed that ordinary users cannot make an access to the special data. If the memory card is used in a general-purpose data-processing electronic apparatus, such as a personal computer, however, ordinary users can easily access the user block. This is because the entire user block can be usually accessed. Inevitably, the contents of the special data are easily made known to the ordinary users or may be easily rewritten.

DISCLOSURE OF THE INVENTION

The present invention has been made in view of the foregoing. The object of this invention is to provide a memory apparatus that can manage special data to disable users to access the special data easily, and also a data-processing apparatus and a data-processing method that use the memory apparatus as a recording medium.

The memory apparatus according to the present invention memory apparatus comprises: a first storage region from which data can be read and into which data can be written, in accordance with instructions made by a user; and a second storage region from which data can be read and into which data can be written, when a data-processing processing apparatus to which the memory apparatus is connected performs prescribed procedures.

That is, the memory apparatus according to the invention comprises the second storage region, i.e., a storage region other than the first storage region from which data can be read and into which data can be written, in accordance with instructions made by the user. Data can be read from, and written into, the second storage region when a data-processing apparatus, to which the memory apparatus is connected, performs prescribed procedures. Special data, such as a password, information about the copyright of the data stored in the first storage region, the use history of the memory apparatus or the quality history thereof, may be stored in the second storage region. If so, the user cannot easily make an access to the special data.

The memory apparatus may further comprise a read-only storage region storing address data of the second storage region. In this case, the second storage region can be designated by referring to the address data written in the read-only storage region.

The data-processing apparatus according to the invention comprises data-processing means for writing data into, and reading data from, a memory apparatus. The memory apparatus comprises: a first storage region from which data can be read and into which data can be written, in accordance with instructions made by a user, and a second storage region from which data can be read and into which data can be written, when a data-processing apparatus to which the memory apparatus is connected performs prescribed procedures. The data-processing means writes data into, or reads data from, the first storage region when the instructions made by the user are supplied to the memory apparatus to write the data into, or to read the data from, the memory apparatus.

In the data-processing apparatus, data is written into the first storage region of the memory apparatus when the instructions made by the user are supplied to the memory apparatus to write the data into the memory apparatus. Data is read from the first storage region when the instructions made by the user are supplied to the memory apparatus to read the data from the memory apparatus. That is, data cannot be written into, or read from, the second storage region in accordance with the instructions made by the user.

Thus, when the data-processing apparatus is used to write data into or read the data from the memory apparatus, such special data as described above written into the second storage region, remains unknown to the user and cannot be rewritten by the user.

In the data-processing apparatus, the data-processing means may designate the second storage region of the memory apparatus upon receipt of instructions for writing the data into the second storage region of the memory apparatus or reading the data from the second storage region, thereby writing the data into the second storage region or reading the data from the second storage region.

In this case, the data-processing means can read such special data as described above from, and write such special data into, the second storage region. However, the user cannot make the instruction to write the data into, or read the data from, the second storage region. This instruction can be issued only on a special occasion, for example when the password input by the user is authenticated.

The data-processing apparatus may be designed such that password data is written in the second storage region of the memory apparatus. The data-processing means receives instructions to read the password data from the second storage region when the user makes instructions to write data into the memory apparatus or read data from the memory apparatus. The data-processing means reads the password data from the second storage region or writes data into the first storage region of the memory apparatus or reads data from the first storage region when the password data read from the second storage region coincides with the password data input by the user.

In this case, valid instructions are only those made by the authenticated user who knows the password data written in the second storage region. That is, data can be read from and written into the first storage region, only in accordance with the instructions made by the authenticated user.

In the data-processing method according to the present invention, use is made, as a recording medium, an memory apparatus comprising a first storage region from which data can be read and into which data can be written, on the basis of instructions made by a user, and a second storage region from which data can be read and into which data can be written, when a data-processing apparatus to which the memory apparatus is connected performs prescribed procedures. Data is written into, or read from, the first storage region when the user makes instructions to write the data into, or to read the data from, the memory apparatus.

In this method, data cannot be written into or read from the second storage region in accordance with the instructions made by the user. Hence, such special data as mentioned above, which is written in the second storage region, remains unknown to the user and cannot be rewritten by the user.

In the data-processing method, the second storage region of the memory apparatus may be designated upon receipt of instructions for writing the data into the second storage region of the memory apparatus or reading the data from the second storage region, and the data is written into the second storage region or read from the second storage region.

If this in the case, it is possible to read such special data as mentioned above from, and write the same into, the second storage region of the memory apparatus. However, the user cannot make the instruction to write the data into, or read the data from, the second storage region. This instruction can be issued only on a special occasion, for example when the password input by the user is authenticated. In the data-processing method, password data may be written in the second storage region of the memory apparatus. Instructions to read the password data from the second storage region may be received when the user makes instructions to write data into the memory apparatus or read data from the memory apparatus, and the password data may thereby be read from the second storage region. Then, data is written into the first storage region of the memory apparatus or read from the first storage region when the password data red from the second storage region coincides with the password data input by the user.

In this case, valid instructions are only those made by the authenticated user who knows the password data written in the second storage region. That is, data can be read from and written into the first storage region, only in accordance with the instructions made by the authenticated user.

BRIEF DESCRIPTION OF THE DRAWINGS

FIG. 3 illustrates a conversion table showing the correspondence between physical addresses and logical addresses;

BEST MODE FOR CARRYING OUT THE INVENTION

The best mode for carrying out the present invention will be described, with reference to the accompanying drawings. In the following description, a memory card according to the invention will be explained, which is designed to be used while connected to a personal computer, a digital still camera, or the like.

This memory card comprises a nonvolatile memory device (flash memory) that is used as memory means. In the memory card, the flash memory, i.e., the memory means, has a storage area. The storage area is divided into a plurality of blocks for recording data. The data stored in the memory means are managed in units of blocks.

Figure 1:
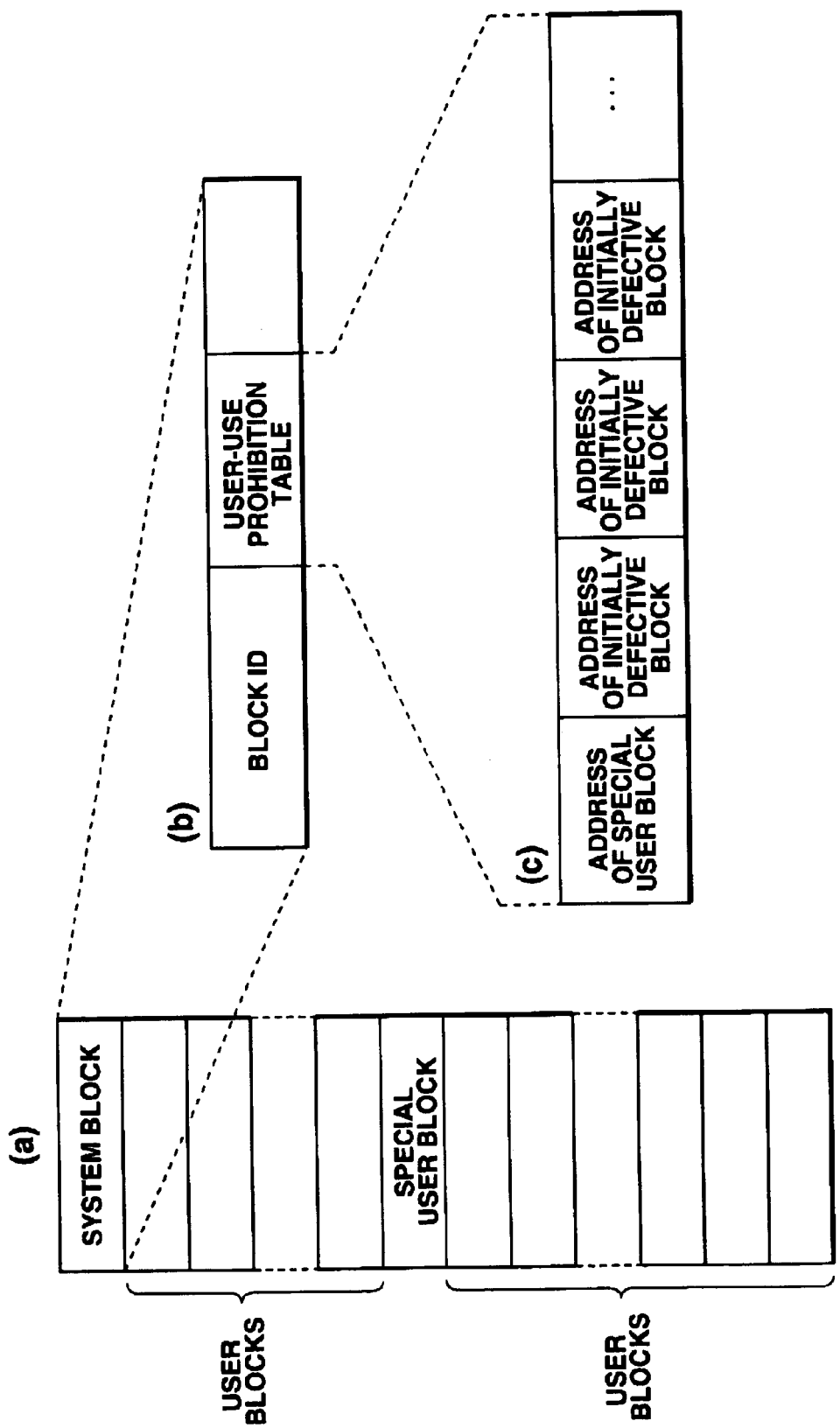
FIG. 1 is a diagram showing the configuration of the storage area of a memory card according to the present invention.

The storage area of the memory card according to the invention may have such a configuration as is illustrated in FIG. 1. As shown in FIG. 1(a), the storage area of the memory card has a system block, which is a read-only storage region. The storage area further has a first storage region, or a plurality of user blocks, in which data can be rewritten. Still further, the storage area has a second storage region, or at least one special user block, in which data can be rewritten.

Of the storage regions of the memory card, the system block is a read-only region in which data has been already written. That is, the system-related data, e.g., data representing the block configuration, had been written as the read-only data into the system block before the memory card was delivered from the factory. More precisely, a block ID and a user-use prohibition table are stored in the system block as is illustrated in FIG. 1(b). The block ID specifies that this block is a system block. The user-use prohibition table specifies the blocks any user cannot use.

Only the block ID and the user-use prohibition table are exemplified here as the information that is already written in the system block. Nonetheless, other information may be written in the system block. More specifically, it is desired that the data required to activate the memory card, such as the type of the memory card, the total number of blocks and the size of each block, be written in the system block. Moreover, management data, such as serial numbers, may be written in the system block, as well.

The user-use prohibition table stored in the system block is a table that contains the address data items of those blocks any user cannot use. In other words, the user cannot use any block the address of which is registered in the user-use prohibition table. More precisely, the addresses of initially defective blocks and the address of the special user block are registered in the user-use prohibition table as is illustrated in FIG. 1(c). The word "initially defective blocks means user blocks" in which defective memory chips have been found at the time of assembling the memory card.

Once the addresses of the initially defective blocks are registered in the user-use prohibition table, the user will never happen to access the user blocks containing initially defective memory chips. This prevents errors at the time of storing data into the memory card.

Since the address of the special user block is registered in the user-use prohibition table, the access to the special user block, made by the user, is restricted. Thus, the data stored in the special user block will not be easily known to the user or easily rewritten by the user.

Of the storage regions of the memory card, the user blocks are storage regions in which data can be rewritten. Data can be rewritten in the user blocks, in accordance with the instructions made by the user. That is, the user blocks are storage areas open to the user. The user can write data into the user blocks, can erase the data stored in the user blocks and can read the data stored in the user blocks.

To state more specifically, the image data the user has photographed with a digital still camera, the data the user has generated in a personal computer, the music data distributed from a music distributor, or similar data is stored, as user data, into the user blocks in accordance with the instructions made by the user.

Of the storage regions of the memory card, the special user block is a storage region in which data can be rewritten. However, data can neither be read from nor written into the special user block in accordance with the instructions made by the user. The data can be read from and written into the special user block only when the data-processing apparatus to which the memory card is connected carries out special procedures.

Special data items, such as a password, that should not be easily rewritten or read by the user are stored into the special user block when the data-processing apparatus to which the memory card is connected performs the special procedures.

Once the special data items are stored in the special user block in this way, the contents of the special data items would not easily be known to, or rewritten by, ordinary users.

The memory card may have only one special user block or a plurality of special user blocks. If the card has too many special user blocks, however, the user blocks will decrease in number. In view of this, it is desired that special user blocks be provided in an appropriate number in consideration of the storage capacity the memory card has, the use of the special user blocks, and the like.

The memory card having the block configuration described above may be connected to a data-processing apparatus such as a personal computer, by the use of a PCMCIA (ATA card) adapter or the like. In this case, the personal computer can make accesses to only the user blocks in the storage area of the memory card. Neither the system block nor the special user block is seen from the personal computer. That is, their existence is unknown to the personal computer.

Further, the memory card may be connected directly to a data-processing apparatus compatible with the memory card, such as a digital still camera or a music data receiving apparatus. In this case, the user data, i.e., the image data generated by the digital still camera or the music data received by the music data receiving apparatus, is stored into the user blocks in accordance with the user's instructions. If necessary, the digital still camera and the music data receiving apparatus can write special data, such as a password and use history, into the special user block and can read the special data from the special user block, by performing special procedures.

Figure 2:
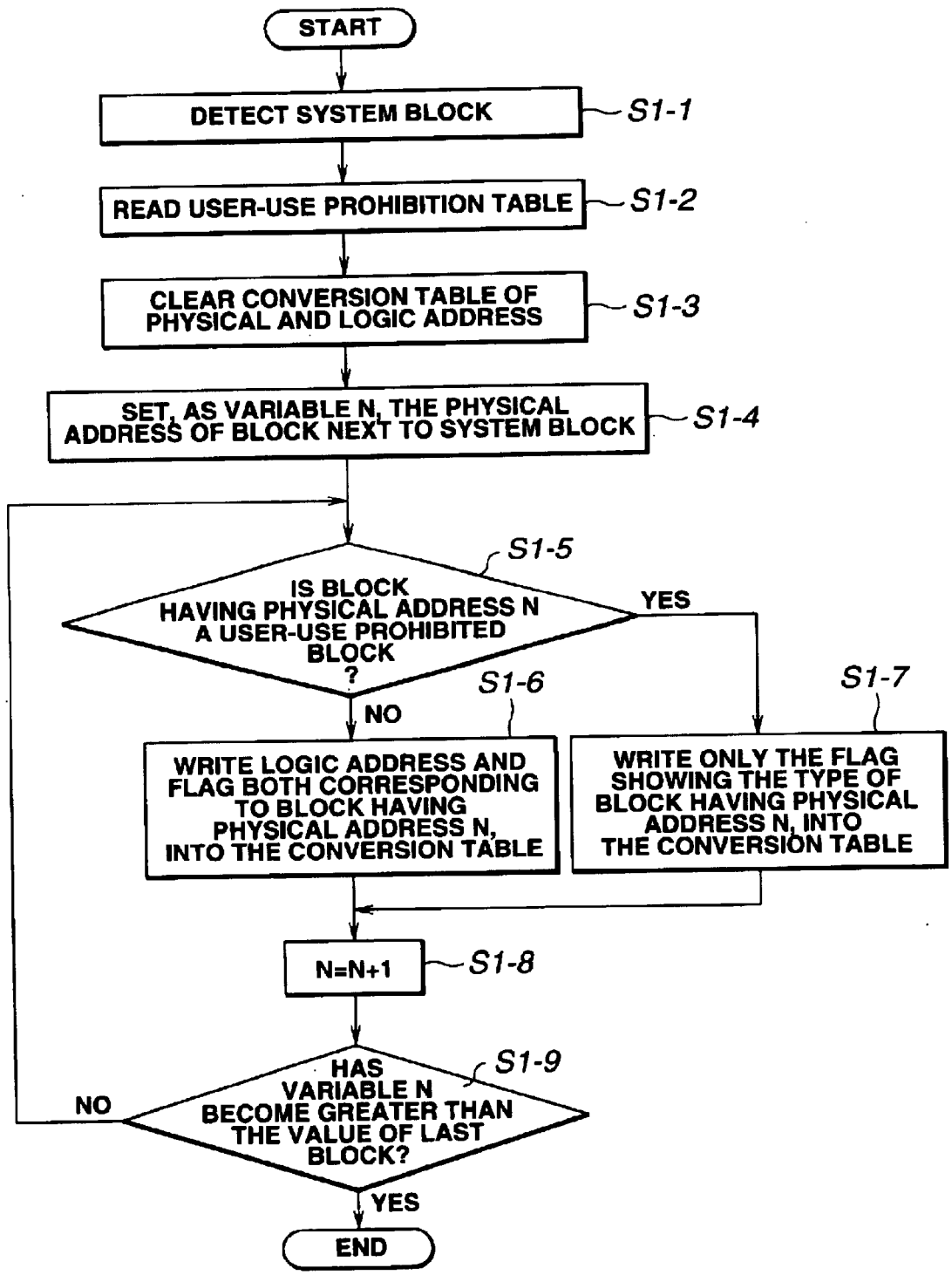
FIG. 2 is a flow chart explaining an example of the system initialization performed when the memory card is set in a data-processing apparatus and then activated.

With reference to the flow chart of FIG. 2 it will be explained how the system is initialized when the memory card is connected to a data-processing apparatus and then activated.

When the memory card is connected to the data-processing apparatus, the data-processing apparatus searches the memory card for the system block in Step S101. The block ID stored in the system block is used to detect the system block.

Then, in Step S1-2, the data-processing apparatus reads the user-use prohibition table stored in the system block of the memory card.

In Step S1-3, the data-processing apparatus initializes a conversion table for converting physical addresses to logic addresses and vice versa. This table is stored in a memory provided in the data-processing apparatus. The conversion table stores the correspondence between the physical addresses that are assigned to the blocks of the memory card and the logic addresses that are used in the data-processing apparatus to manage data. The conversion table also stores the flags specifying the types of blocks, which correspond to the physical addresses and logic addresses.

In Sep S1-4, the data-processing apparatus sets, as variable N, the physical address of the block next to the system block.

Next, in Step S1-5, the data-processing apparatus refers to the user-use prohibition table, thereby determining whether or not the block having the physical address of N is one that the user is prohibited from using. If it is determined that the block is not one the user is prohibited from using, the flow goes to Step S1-6. In Step S1-6, the logic address corresponding to the block having the physical address of N and the flag specifying the type of this block are written into the conversion table for converting physical addresses to logic addresses and vice versa.

If it is determined in Step S1-5 that the block is one the user is prohibited from using, the flow goes to Step S1-7. In Step S1-7, only the flag specifying the type of this block is written into the conversion table for converting physical addresses to logic addresses and vice versa.

Then, the data-processing apparatus adds one (1) to variable N In Step S1-8 and compares the value of variable N with the value of the physical address of the last block of the memory card in Step S1-9. Thus, the apparatus determines whether variable N has become greater than the value of the last block. If the apparatus determines that the variable N has not become so yet, the flow returns to Step S1-5, whereby the process is repeated.

If it is determined in Step S1-9 that variable N has become greater than the value of the last block, the process of initializing the system is terminated.

When the system is initialized as described above, there is generated a conversion table for converting physical addresses to logic addresses and vice versa, in the memory of the data-processing apparatus. FIG. 3 shows an example of the conversion table. As shown in FIG. 3, the conversion table stores the correlation between physical addresses and logic addresses.

Stored also in the conversion table are flags that specify the types of the blocks. That is, each flag indicates whether the block is the system block, a user block, the special user block, or a defective block. The flag "S" specifies the system block. A flag "U", a flag "SU" and a flag "B" specify a user block, the special user block and a defective block, respectively.

Of the blocks of the memory card, the system block and the user-use-prohibited blocks are not assigned with logic addresses. Therefore, in the logic-address column in FIG. 3, marks "X" are shown for the system block and the user-use prohibited blocks.

Figure 4:
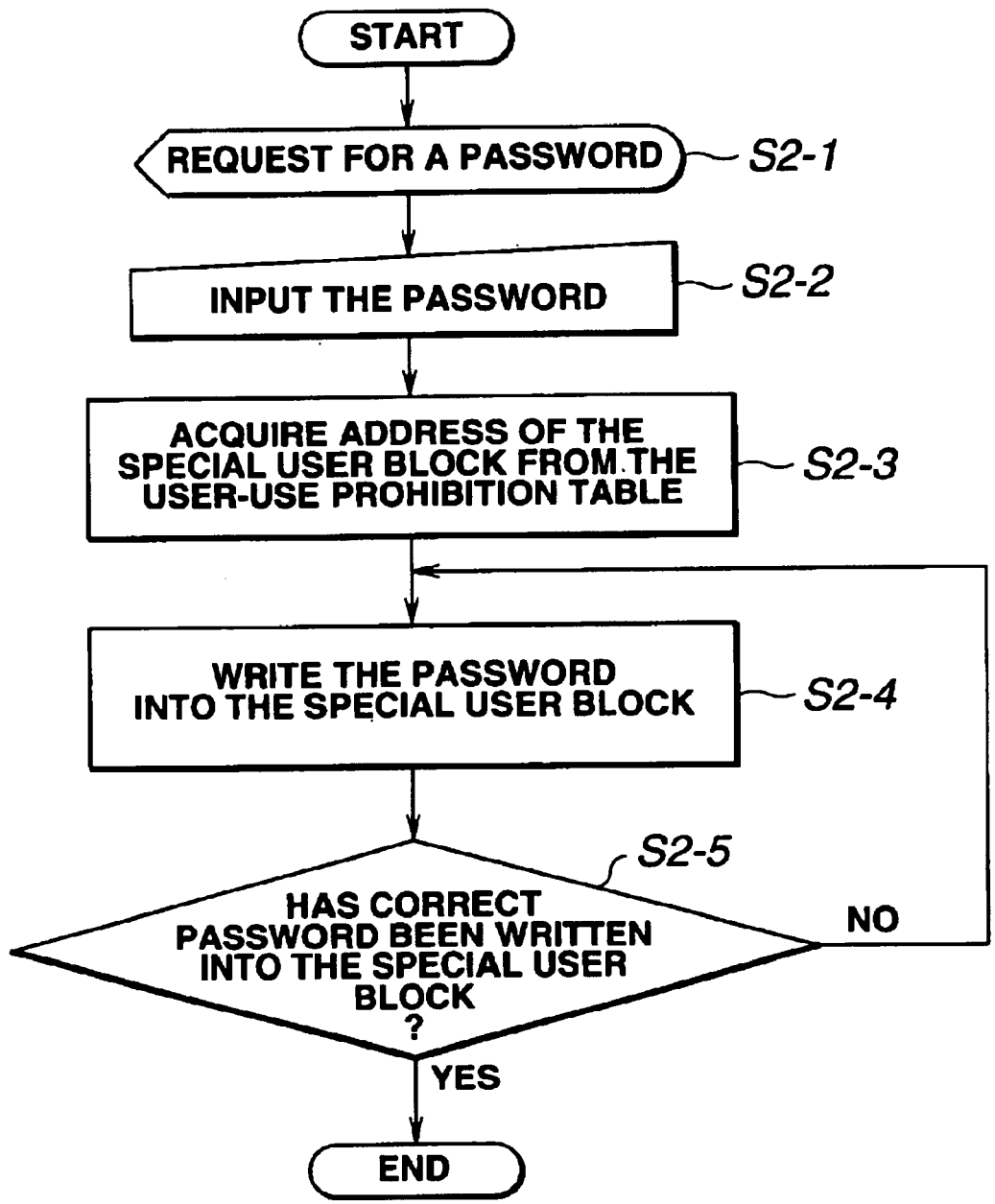
FIG. 4 is a flow chart explaining a process of setting a password in the memory card.

An example of the process of setting a password in the memory card described above will be explained, with reference to the flow chart of FIG. 4. To set a password in the memory card, there is used a data-processing apparatus designed only to set a password, not a general-purpose, data-processing apparatus such as a personal computer.

In order to set a password in the memory card, the data-processing apparatus designed only to set a password in the memory card makes a request for a password in Step S2-1. For example, the apparatus displays a message on a display, asking the person who can set a password to input a password and, thus, making a request for a password.

Then, in Step S2-2, a password is input to the data-processing apparatus. In Step S2-3, the data-processing apparatus acquires the address data of the special user block, from the user-use prohibition table stored in the system block of the memory card. The apparatus therefore designates the address of the special user block.

The data-processing apparatus that is designed only to set a password may initializes the system in such a way as has been described. If so, it can refer to the conversion table stored in the memory, thereby to designate the address of the special user block.

Next, in Step S2-4, the data-processing apparatus makes an access to the special user block that has been designated in Step S2-3. The apparatus then performs the process of writing the password input in Step S2-2, into the special user block.

In Step S2-5, the data-processing apparatus accesses the special user block and reads the password that has been written in Step S2-4. The apparatus correlates the password with the password input in Step S2-2, thus determining if the correct password has been written into the special user block.

If the correct password has not been written into the special user block, the flow returns to Step S2-4, and the process of writing the password into the special user block is performed again. If the correct password has not been written into the special user block, the process of setting a password is terminated.

Once the password has been written into the special user block of the memory card as described above, ordinary users cannot to this special user block. The ordinary users cannot know the password. Nor can they alter or rewritten the password. Hence, the data-processing apparatus that uses the memory card as the recording medium writes and reads data, exclusively in accordance with the instructions made by the authenticated user. This prevents the undesirable event that any other person may read or rewrite the data written in the memory card.

Thus far, it has been described how password data is stored into the special user block. Nonetheless, the data to be stored into the special user block is not limited to password data.

For instance, the information concerning the copyright of the data stored in the user blocks may be stored into the special user block. Once stored in the special user block, the copyright information cannot be accessed by ordinary users. This prevents alteration of the copyright information.

Further, the use history of the memory card may be stored into the special user block. The term "use history" means a record of the accesses that were made to the memory card in the past to read data, for example, from the memory card, write data into the memory card, and format the memory card. Once the use history is recorded in the special user block, it is possible for the user to obtain statistical information about the past use of the memory card.

Still further, the quality history of the memory card may be stored into the special user block. The term "quality history" means a record of the conditions in which the memory card was used while connected to electronic apparatuses and also of the errors that were made in the memory card. Once recorded in the special user block, the quality history can be confirmed and studied, whenever necessary, for example when the memory card is sent back from the user to the sales shop or the manufacturer.

The memory card with a password set in it can be used in various ways. A music data recording/reproducing system, which uses the memory card as a recording medium, will be described below.

The music data recording/reproducing system has a music data receiving apparatus and a speaker. The music data receiving apparatus receives the music data distributed from a music distributor. The music data is stored into a user block of the memory card. The music data is reproduced from the user block of the memory card and output by means of the speaker. It should be noted that the music data receiving apparatus is not a general-purpose data-processing apparatus such as a personal computer. Rather, it is an apparatus compatible with the memory card. It can make an access to the special user block of the memory card.

Figure 5:
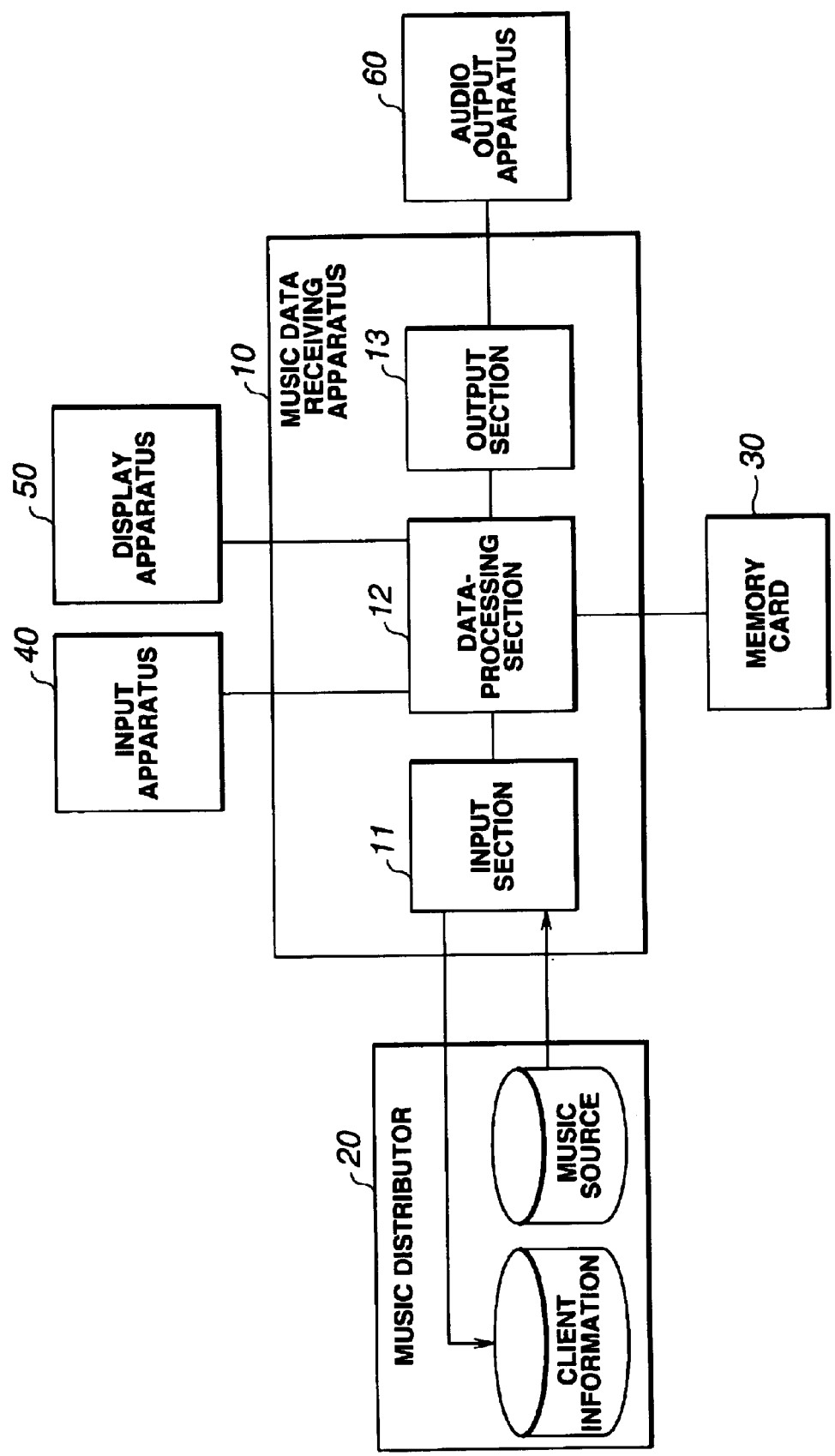
FIG. 5 is a block diagram depicting a music data recording/reproducing system that uses the memory card containing a password, as a recording medium.

As is shown in FIG. 5, the music data receiving apparatus 10 comprises an input/output section 11, a data-processing section 12, and an output section 13. The input/output section 11 receives the music data transmitted from the music source the music distributor 20. The data-processing section 12 writes the music data into the user blocks of the memory card 30 and reads the music data from the user blocks of the memory card 30. The output section 13 outputs the music data the data-processing section 12 has read from the user blocks of the memory card.

An input apparatus 40 and a display apparatus 50 are connected to the data-processing section 12. The input apparatus 40 is, for example, a keyboard and receives the instructions made by the user and other data. The display apparatus 50 is, for example, a liquid crystal panel, and displays the data generated by the data-processing section 12. The memory card 30, in which a password has been set, is connected to the data-processing section 12. An audio output apparatus 60, such as a speaker, is connected to the output section 13.

Figure 6:
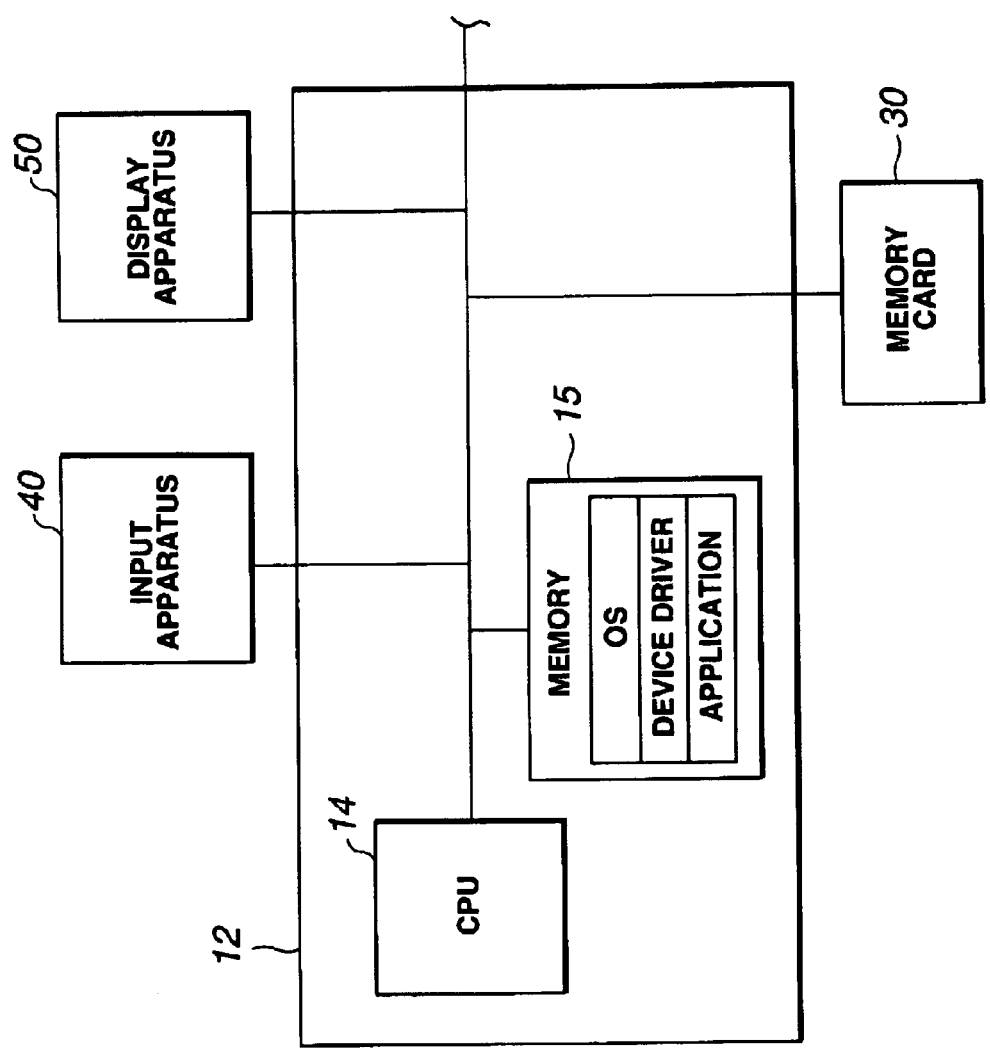
FIG. 6 is a block diagram showing an example of the data-processing section incorporated in a music data receiving apparatus.

As shown in FIG. 6, the data-processing section 12 comprises a central processing unit (CPU) 14 and a memory 15. The CPU 14 and the memory 15 are connected by a bus 16. The memory card 30, input apparatus 40 and display apparatus 50 are connected to the CPU 14 and the memory 15 by the bus 16.

The CPU 14 serves to perform various processes in the data-processing section 12. The memory 15 is used as a work area for assisting the CPU 14 to effect the processes. It serves as a storage area in which the operation system (OS) (the program the CPU 14 uses to perform the processes), device drivers, and application programs are stored.

In the music data recording/reproducing system thus constructed, the music data the music data receiving apparatus 10 has received is written into a user block of the memory card 30 in the following manner. First, the memory card 30 is connected to the music data receiving apparatus 10. At this time, the system is initialized as has been described above, and a conversion table is generated in the memory 15 of the music data receiving apparatus 10. The conversion table shows the correlation between physical addresses and logic addresses of the blocks in the memory card 30 and stores flags indicating the types of the blocks. At the same time, a FAT (File Allocation Table) and a directory entry are generated in the memory of the music data receiving layer 10.

When the memory card 30 is connected to the music data receiving apparatus 10, the apparatus 10 authenticates the password.

Figure 7:
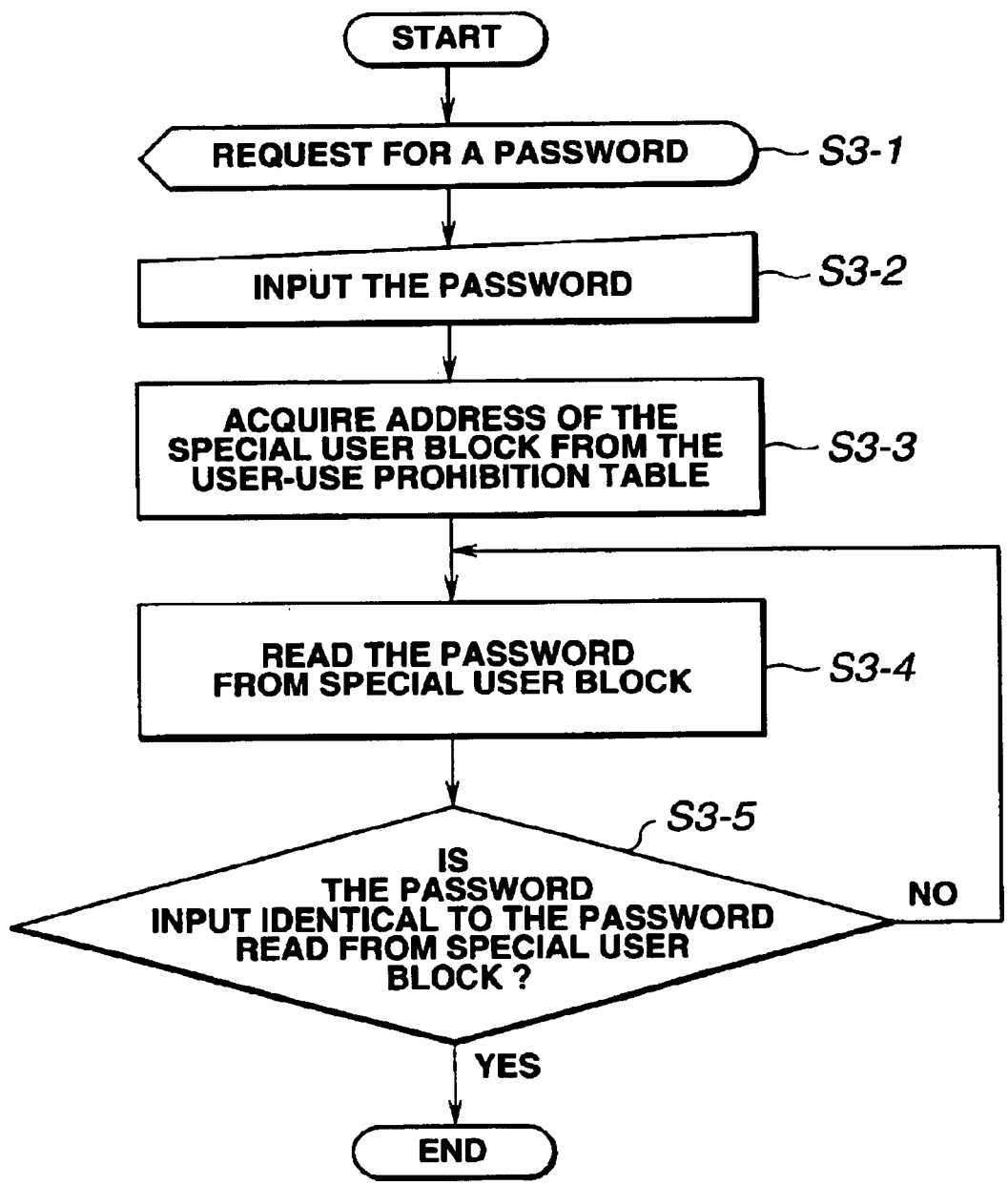
FIG. 7 is a flow chart explaining a process of authenticating the user in accordance with the password written into the special user block of the memory card.

How the music data receiving apparatus 10 authenticates the password will be explained, with reference to the flow chart of FIG. 7.

First, in Step S3-1, the music data receiving apparatus 10, to which the memory card 30 has been connected, requests that the user input a password. For example, the data-processing section 12 of the music data receiving apparatus 10 causes the display apparatus 50 to display a message, asking the user to input a password.

In Step S3-2, the user operates the input apparatus 40, thereby inputting a password. Then, in Step S3-3, the data-processing section 12 of the music data receiving apparatus 10 accesses the system block of the memory card 30, acquiring the address data of the special user block from the user-use prohibition table. The section 12 specifies the address of the special user block on the basis of the address data.

The conversion table storing the flags indicating the types of the blocks in the memory card 30 has been generated in the memory 15 of the data-processing section 12 of the music data receiving apparatus 10 by initializing the system as described above. More correctly, the conversion table is stored in that storage area of the memory 15, in which the device drivers are stored. Therefore, the data-processing section 12 of the music data receiving apparatus 10 may refer to the conversion table, thereby to specify the address of the special user block.

In Step S3-4, the data-processing section 12 of the music data receiving apparatus 10 accesses the special user block that has been specified in Step S3-3. The section 12 then reads the password from the special user block.

In Step S3-5, the data-processing section 12 of the music data receiving apparatus 10 correlates the password input in Step S3-2 with the password read in Step S3-4 from the special user block. If these passwords do not coincide, the section 12 does not allow the user to use the memory card, and the flow returns to Step S3-1. In Step S3-1, the music data receiving apparatus 10 requests again that the user input a password. If Step S3-5 is repeated several times and the passwords have yet to coincide, the data-processing section 12 of the music data receiving apparatus 10 determines that the password has been input by a user who has not been authenticated. In this case, the data-processing section 12 may cause the display apparatus 50 to display a message, indicating that an error has been made, and may terminates the process of authenticating the user, not allowing the user to use the memory card.

On the other hand, if the passwords coincide, the section 12 allows the user to use the memory card. The process of authenticating the user in accordance with the password then ends.

After completion of the process of authenticating the user in accordance with the password, the user can write the music data received by the music data receiving apparatus 10, as user data, into the user block of the memory card 30. Also, the user can reproduce the music data read from the user block of the memory card 30 and then output the music data from the audio output apparatus 60, which is, for example, a speaker or a headphone.

An example of the process of writing the music data received by the music data receiving apparatus 10, as user data, into the user block of the memory card 30 will be described below.

First, the music data is transmitted from the music distributor 20 to the music data receiving apparatus 10. The music data is stored as music source and include the numbers assigned to various musical pieces. The music data receiving apparatus 10 receives the music data and makes the display apparatus 50 display the music data.

Next, the user refers to the music data displayed by the display apparatus 50 and selects one of the musical pieces. The user then operates the input apparatus 40, thereby inputting the number assigned to the musical piece selected.

The music data receiving apparatus 10 transmits the number assigned to the musical piece selected by the user, to the music distributor 20. The music distributor 20 transmits the music data that corresponds to the music number received at the music distributor 20.

In the music data receiving apparatus 10, the input/output section 11 receives the music data transmitted from the music distributor 20. The data-processing section 12 writes the music data as user data, in the form of a file, into the user block of the memory card 30. The data-processing section 12 of the music data receiving apparatus 10 may render copyright bits valid in the memory card 30. This can make it impossible to read the music data from the user block of the memory card 30 by the use of a data-processing apparatus such as a general-purpose personal computer. The copyright bits have been defined to limit the use of any data protected by copyright. As long as the copyright bits remain valid, the memory card 30 can not be used in data-processing apparatuses such as general-purpose personal computers.

The process of writing the music data into the user block of the memory card 30 ends. Then, the data representing the charge for use of the music data, the information about the user and the like are transmitted to the music distributor 20 from the data-processing section 12 of the music data receiving apparatus 10. More precisely, they are transmitted from the input/output section 11 of the section 12.

Figure 8:
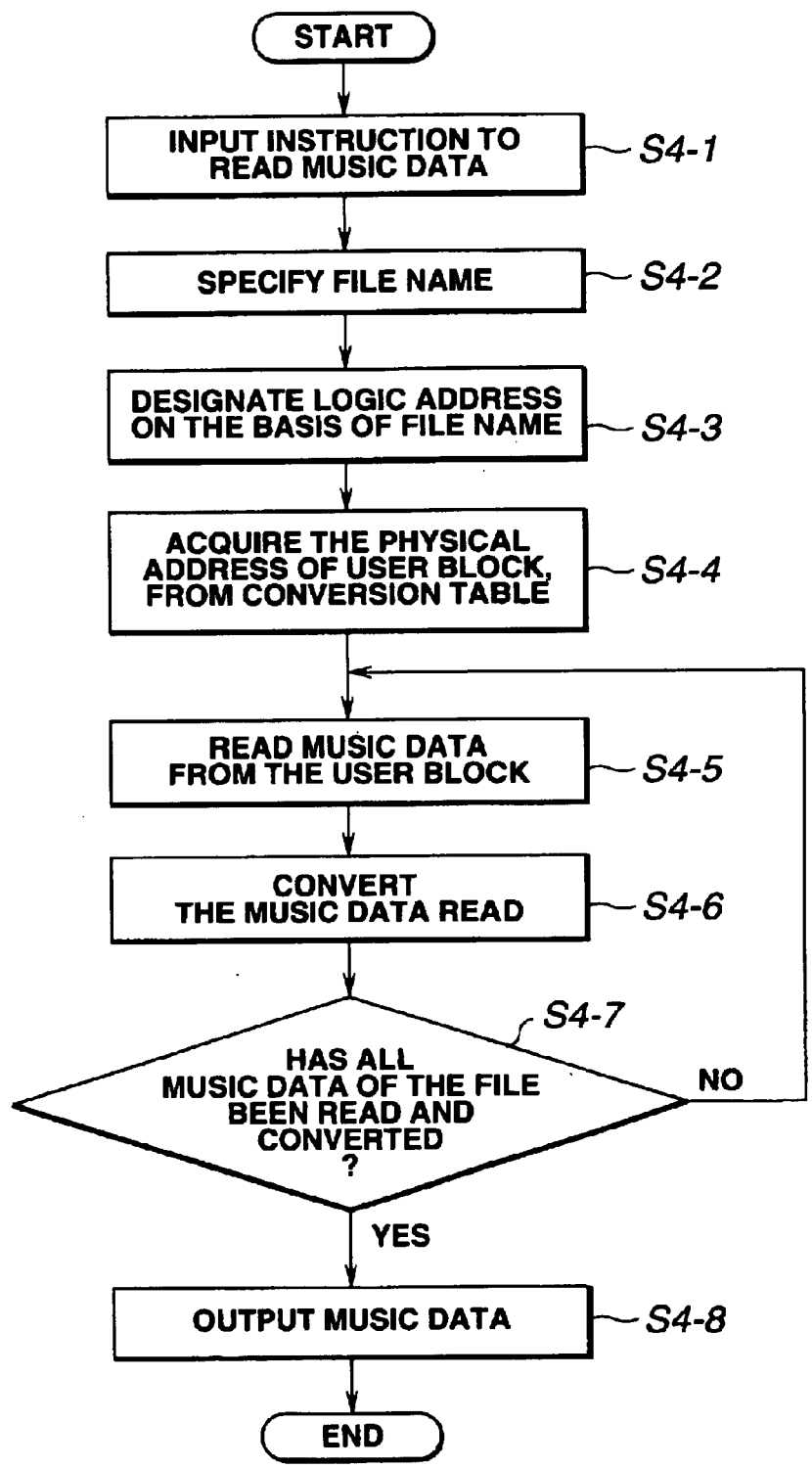
FIG. 8 is a flow chart explaining a process reproducing and outputting the music data written into the memory card, in the music data recording/reproducing system mentioned above.

An example of the process of reproducing the music data written in the user block of the memory card 30 and outputting the same from the audio output apparatus 60 will now be described, with reference to the flow chart of FIG. 8.

First, in Step S4-1, the instruction made by the user is input to the music data receiving apparatus 10 via the input apparatus 40, upon completion of the process of authenticating the user on the basis of the password. The instruction is so input to reproduce the music data.

The data-processing section 12 of the music data receiving apparatus 10 accesses the user block of the memory card 30. The section 12 reads the music data written in the user block of the memory card 30.

More specifically, the CPU 14 reads a command to reproduce the music data stored in the application storage area, when the instruction is input from the user to reproduce the music data. To execute this command, the name of the file constituting the music data the user has designated as one to be read is specified in Step S4-1. The music data is thereby read from the application storage area.

When the name of the file constituting the music data is specified, the device driver receives the file name and the data-reproducing command. In Step S4-3, the device driver refers to the FAT and the directory entry, thus designating the logic address of the music data that constitutes that file.

Next, in Step S4-4, the device driver refers to the conversion table that stores the correlation between the addresses of physical blocks and the addresses of logic blocks, all blocks provided in the memory card 30. Thus, the device driver acquires the physical address data of the user block that contains the music data constituting the file.

In Step S4-5, the device driver generates a block-reading command that has, as a parameter, the physical address it has acquired. The device driver then accesses the user block of the memory card 30, reading the music data from the user block having the physical address acquired.

In Step S4-6, the CPU 14 converts the music data read from the user block, in a particular manner, to data that can be output to the audio output apparatus 60. This data-converting process is performed in units of data items, each read at a time from a user block of the memory card 30.

Next, in Step S4-7, it is determined whether all music data constituting the file has been read and converted. If it is determined that any part of the music data that constitutes the file has not been read or converted yet, the flow returns to Step S4-5. In Step S4-5, the music data is read again from the user block. In Step S4-6, the music data read out is converted.

If it is determined in Step S4-7 that all music data constituting the file has been read and converted, the flow goes to Step S4-8. In Step S4-8, the music data is transmitted to the audio output apparatus 60 from the output section 13 of the music data receiving apparatus 10. The audio output apparatus 60 outputs the music data. Thus does end the process reproducing and outputting the music data.

In the case described above, the music data written in the user block of the memory card 30 is reproduced when the user is authenticated in accordance with the password. Only the data not protected by copyright may be reproduced, while the data protected by copyright is not reproduced, even if the user cannot be authenticated in accordance with the password. The data protected by copyright is encrypted, as usual, and stored in the user block of the memory card 30. The data encrypted is read from the user block, decrypted by a data-decrypting means and finally output. Hence, the data not protected by copyright can be reproduced, while preventing illegal reproduction of the copyrighted data, if the copyrighted data is not decrypted when the user is not authenticated in accordance with the password.

The music data recording/reproducing system described above uses, as recording medium, the memory card 30 that stores a password. A system for recording and reproducing various kinds of data, such as movie data, can be provided, which is similar in structure to the music data recording/reproducing system. For example, a movie data recording/reproducing system may be provided. In this system, the video data receiving apparatus receives the movie data distributed from a movie distributor. The movie data is stored into the user blocks of the memory card 30. The motion-picture data and audio data are read from the user blocks of the memory card 30. The motion-picture data is transmitted to the display apparatus such as a CRT display or a liquid crystal display, whereas the audio data is transmitted to the audio output apparatus such as a speaker. The display apparatus displays the motion picture, and the audio output apparatus outputs the sound.

The memory card with a password set in it may be used in a security system, in which the password a member of is authenticated by using the memory card in order to open or close a clock.

In the security system, memory cards are issued to only the members. Each member operates a data-processing apparatus for setting passwords, thereby writing a password into the special user block of his or her memory card. Alternatively, memory cards, each having a password written in it by the use of a dedicated data-processing apparatus, are issued to the members, and each member is informed of the password written in the memory card issued to him or her.

Each member connects the memory card to the data-processing apparatus that comprises an actuator for controlling the opening and closing of the lock. This data-processing apparatus is not a general-purpose one such as a personal computer. Rather, it is a data-processing apparatus compatible with the memory cards and can make an access to the special user blocks of the memory cards if prescribed procedures are performed.

When the memory card is connected to it, the data-processing apparatus authenticates the member holding the memory card, on the basis of the password in such a way as described above. Only when the member is authenticated in accordance with the password, the actuator of the apparatus is operated, thereby opening the lock. In this security system, any person who has illegally obtained a memory card cannot have the lock opened. This is because he or she does not know the password set in the memory card. The password, which is necessary to open the lock, is written in the special user block of the memory card, to which the user cannot make an access. Hence, the password remains unknown to anyone who has illegally possesses the memory card.

In the security system described above, the opening and closing of the lock can be controlled only by authenticating the holder of the memory card in accordance with the password. Therefore, procedures, such as registering of the members, need not be performed at all. The security system can be simple and can yet perform its function reliably.

The memory card with a password set in it may be put to another use. It may be effectively used in a personal-data management system. In this system, the holder of the memory card is authenticated in accordance with the password. Only if so authenticated, the card holder can refer to and rewrite the personal data, such as medical care record.

In the personal-data management system, the memory card with the password set in it is used as a recording medium for recording the personal data such as the medical care record. The personal data may be written in the user blocks of the memory card. If the data is very important and is not of a great amount, it may be written into the special user block. In this case, however, the personal data is written into a region of the special user block, other than the region into which the password has been written. For instance, if the password is written in the first page of the special user block, the personal data will be written into the second page of the special user block.

To refer to or correct the personal data written in the memory card, or to write additional personal data, the memory card is connected to the data-processing apparatus having a data-processing section for reading data from, and writing data into, the memory card. The data-processing apparatus is not a general-purpose one such as a personal computer. Instead, one is compatible with memory cards. It can access the special user block of each memory card by performing prescribed procedures.

When a memory card is connected to it, the data-processing apparatus authenticates the holder of the memory card in accordance with the password. Only if the card holder is authenticated on the basis of the password, the apparatus reads the personal data from the user blocks or special user block of the memory card in accordance with an instruction made by the user. At this time, to read the personal data from the user blocks, the data-processing apparatus performs the same process as music data is read from the user blocks of the memory card in the music data recording/reproducing system described above. To read the personal data from the special user block, the apparatus carries out the same process as the user is authenticated on the basis of the password.

Next, in the data-processing apparatus, a video encoder or the like causes a display apparatus, such as a CRT display or a liquid crystal display, to display the personal data that has been read from the memory card. When the user input an instruction to correct the personal data displayed by the display apparatus or to add new personal data, the data-processing apparatus rewrites the personal data, in the memory card to the personal data input by the user, or writes the new personal data into the memory card.

The personal-data management system allows the user to refer to or correct the personal data written in the memory card and to write new personal data into the memory card, only if the user is authenticated in accordance with the password. Thus, the personal data, e.g., medical care record, can be managed in safety. In the personal-data management system, the password that the user must input in order to refer to or correct the personal data or to add new personal data remains unknown to any other persons. This is because the password is written in the special user block of the memory card, to which nobody can make an access. Hence, any other person cannot read or rewrite the personal data.

As has been described above in detail, the memory card according to the present invention has a special user block that cannot be accessed by ordinary users. Data that should not be disclosed to the user, such as a password, can be stored in the special user block.

In the case of the conventional memory card, all blocks except the system block can be accessed from general-purpose data-processing apparatuses such as personal computer. It is therefore impossible to store data that should not be disclosed to the user, such as the password, in such a way to maintain it concealed from the user.

By contrast, the memory card according to the present invention has a special user block for storing data that should not be disclosed to the user. Hence, the data, e.g., the password, can be stored and concealed from the user. Unlike the conventional memory card, the memory card according to this invention can therefore help to provide a system that excels in security.

INDUSTRIAL APPLICABILITY

With the memory apparatus according to the present invention, such as a memory card, it is possible manage data that should not be easily rewritten or read by the user, such as the password or the use history, so that the user cannot easily make an access to that data.

What is claimed is:

1. A memory apparatus comprising:
   a first storage region from which data can be read and into which data can be written, in accordance with instructions made by a user,
   a second storage region from which data can be read and into which data can be written by a data-processing apparatus, said second storage region having a user-use prohibition table which is normally inaccessible to said user and which has a plurality of addresses of data items in which one address designates one or more defective locations in said memory apparatus, wherein said user or said data-processing apparatus is prohibited from accessing said one or more defective locations contained in said user-use prohibition table; and
   a conversion table which includes logic addresses which are assigned only to blocks in said first storage region and are not assigned to (i) defective blocks and (ii) non-defective blocks in said second storage region.

2. A memory apparatus according to claim 1, characterized in that the first storage region and the second storage region are composed of non-volatile memory elements.

3. A memory apparatus according to claim 1, characterized in that the second storage region is used as a region for storing copyright data concerning the data stored in the first storage region.

4. A memory apparatus according to claim 1, characterized in that the second storage region is used as a region for storing a use history of the memory apparatus.

5. A memory apparatus according to claim 1, characterized in that the second storage region is used as a region for storing a quality history of the memory apparatus.

6. A memory apparatus according to claim 1, characterized by further comprising a read-only storage region storing address data of the second storage region.

7. A data-processing apparatus comprising data processing means for writing data into, and reading data from, a memory apparatus comprising a first storage region from which data can be read and into which data can be written, in accordance with instructions made by a user, a second storage region from which data can be read and into which data can be written by said data-processing apparatus, said second storage region having a user-use prohibition table which is normally inaccessible to said user and which has a plurality of addresses of data items in which one address designates one or more defective locations in maid memory apparatus, and a conversion table which includes logic addresses which are assigned only to blocks in said first storage region and are not assigned to (i) defective blocks and (ii) non-defective blocks in said second storage region;
   wherein said data-processing means writes data into, or reads data from, the first storage region when the instructions made by the user are supplied to the memory apparatus to write the data into, or to read from, the memory apparatus; and
   wherein said user or said data-processing apparatus is prohibited from accessing said one or more defective locations contained in said user-use prohibition table.

8. A data-processing apparatus according to claim 7, characterized in that the data-processing means refers to a conversion table showing a physical address of the first storage region of the memory apparatus and data to be written into the first storage region or a logic address of the data written in the first storage region, thereby writing the data into the first storage region or reading the data from the first storage region.

9. A data-processing apparatus according to claim 8, characterized in that the data to be written into the first storage region of the memory apparatus or the data written in the first storage region of the memory apparatus is managed in units of files, and the data-processing means designates a logic address from the data written into the first storage region of the memory apparatus or from the file name of the data to be written in the first storage region and refers to the conversion table, thereby writing data into the first storage region or reading the data from the first storage region.

10. A data-processing apparatus according to claim 7, characterized in that the data-processing means designates the second storage region of the memory apparatus upon receipt of instructions for writing the data into the second storage region of the memory apparatus or reading the data from the second storage region, thereby writing the data into the second storage region or reading the data from the second storage region.

11. A data-processing apparatus according to claim 10, characterized in that the data-processing means refers to a conversion table showing a physical address of the second storage region of the memory apparatus, thereby designating the second storage region, and writes data into the second storage region or reads data from the second storage region.

12. A data-processing apparatus according to claim 10, characterized in that the memory apparatus comprises a read-only storage region storing address data of the second storage region, and the data-processing means designates the second storage region on the basis of the address data stored in the read-only storage region, thereby writing data into the second storage region or reading data from the second storage region.

13. A data-processing apparatus according to claim 10, characterized in that password data written in the second storage region of the memory apparatus is read when the data processing means receives instructions to write data into the memory apparatus or read data from the memory apparatus, thereby writing data into the first storage region of the memory apparatus or reading data from the first storage region the password data written in the second storage region coincides with a respective password data input by the user.

14. A data-processing method characterized in that a memory apparatus comprising a first storage region from which data can be read and into which data can be written, in accordance with instructions made by a user, a second storage region from which data can be read and into which data can be written by a data-processing apparatus, said second storage region having a user-use prohibition table which is normally inaccessible to said user and which has a plurality of addresses of data items in which one address designates one or more defective locations in said memory apparatus, and a conversion table which includes logic addresses which are assigned only to blocks in said first storage region and are not assigned to (i) defective blocks and (ii) non-defective blocks in said second storage region; and data is written into, or read from, the first storage region when the user makes instructions to write data into, or to read the data from, the memory apparatus, wherein said user or said data-processing apparatus is prohibited from accessing said one or more defective locations contained in said user-use prohibition table.

15. A data-processing method according to claim 14, characterized in that a conversion table showing a physical address of the first storage region of the memory apparatus and data to be written into the first storage region or a logic address of the data written in the first storage region is referred to, and the data is thereby written into the first storage region or read from the first storage region.

16. A data-processing method according to claim 15, characterized in that the data to be written into the first storage region of the memory apparatus or the data written in the first storage region of the memory apparatus is managed in units of files, a logic address of data is designated from the data to be written into the first storage region of the memory apparatus or from the file name of the data written in the first storage region, and the conversion table is referred to, and the data is thereby written into the first storage region or read from the first storage region.

17. A data-processing method according to claim 15, characterized in that the second storage region of the memory apparatus is designated upon receipt of instructions for writing the data into the second storage region of the memory apparatus or reading the data from the second storage region, and the data is written into the second storage region or read from the second storage region.

18. A data-processing method according to claim 17, characterized in that a conversion table showing a physical address of the second storage region of the memory apparatus is referred to, thereby designating the second storage region, and data is written into the second storage region or read from the second storage region.

19. A data-processing method according to claim 17, characterized in that the memory apparatus comprises a read-only storage region storing address data of the second storage region, the second storage region is designated on the basis of the address data stored in the read-only storage region, and data is written into the second storage region or read from the second storage region.

20. A data-processing method according to claim 17, characterized in that password data is written in the second storage region of the memory apparatus; instructions to read the password data from the second storage region are received when the user makes instructions to write data into the memory apparatus or read data from the memory apparatus, the password data is thereby read from the second storage region, and data is written into the first storage region of the memory apparatus or read from the first storage region when the password data read from the second storage region coincides with the password data input by the user.

* * * * *